L. FRANCISCO.
Harrow.
No. 166,763. Patented Aug. 17, 1875.
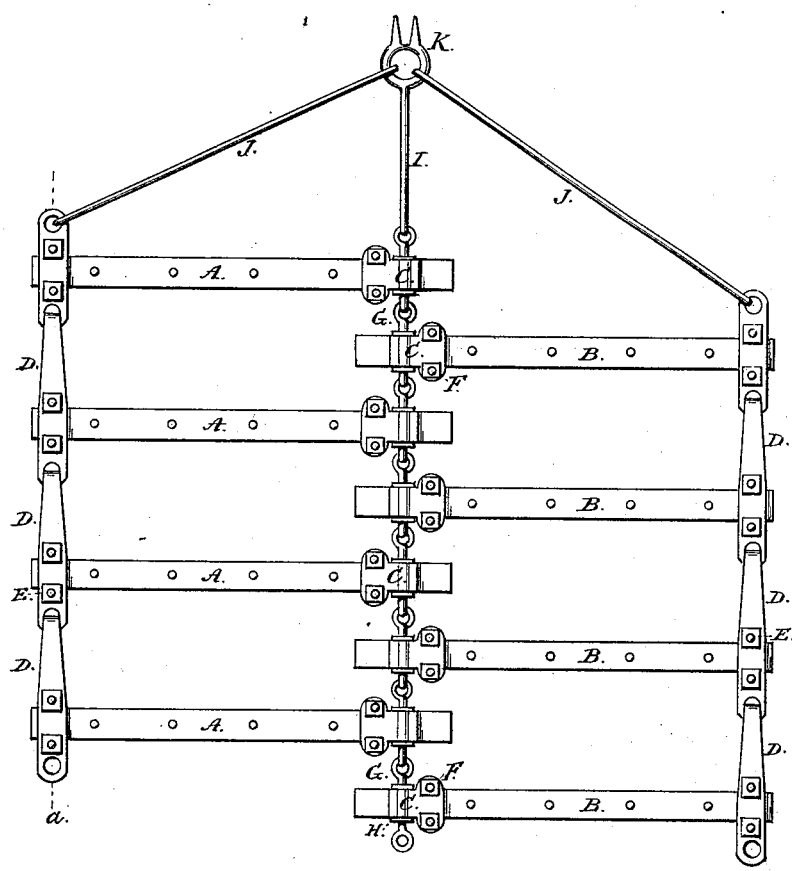
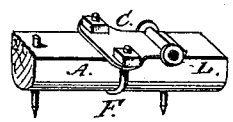
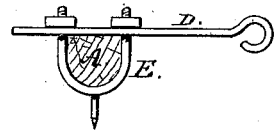
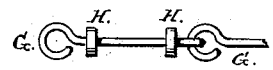
Witnesses:
H. A. Porter
J. C. Morse
Inventor
Levi Francisco

UNITED STATES PATENT OFFICE.

LEVI FRANCISCO, OF OAKLAND, WISCONSIN.

IMPROVEMENT IN HARROWS.

Specification forming part of Letters Patent No. 166,763, dated August 17, 1875; application filed May 24, 1875.

*To all whom it may concern:*

Be it known that I, LEVI FRANCISCO, of Oakland, county of Jefferson, State of Wisconsin, have invented an Improvement in Harrows, of which the following is a specification:

The accompanying drawings form a part of this specification, and similar letters of reference indicate like parts in all the figures.

Figure 1 represents a top view with all its parts connected, forming a hinged adjustable harrow. Fig. 2 is a perspective sectional view of one of the bars A or B, both being alike at the ends where they are connected, showing the cap C, with its box L, clasp and nuts F. Fig. 3 represents coupling-rod G, with its collars H H, Figs. 1 and 3. Fig. 4 represents an end view of one of the bars A at dotted line *a*, with couplings D attached by clasp and nuts E.

My invention relates to an improved coupling and the adjustment of the same, which connects the bars A and B together, the manner and purpose of which I now proceed to illustrate in detail.

The parallel bars A and B are coupled together at their outer ends by plates D, each plate having a hook at one end, which is hooked into a hole in the opposite end of its fellow-plate D. Plates D are clamped to bars A and B by means of clasp and nuts E, as shown in Figs. 1 and 4. The parallel bars A and B, Fig. 1, are all coupled together through the center of the harrow, by which I shall call hinged swivel-joints, composed of hooked rods G and collars H H, Figs. 1 and 3, having their ends hooked together in the form of a chain. These rods G are placed upon the top of bars A and B crosswise, and secured in position by cap-plates C, clasps and nuts F, as shown in Figs. 1 and 2. Fig. 2 represents more fully the form of cap C and clasp, with its nuts F applied to the bars A and B, showing box L, in which the hooked rod G is designed to work, which will allow the harrow to be folded either way, and conform to the uneven surface of the ground.

One peculiar feature of my improvement is, uniting two sets of parallel bars, A and B, to each other in one line of couplings, the ends of one set being placed between those of the other, as in Fig. 1. Another feature is, arranging the clasp F and cap C so they can be adjusted upon the bars A and B when desired to narrow or widen the harrow. When the harrow is narrowed the adjustment of the cap C should be equal upon each bar A and B; then coupling-rods G will always maintain a central line.

It will be observed that by contracting the width by adjustment one set of bars is thrust farther between those of the other, thereby doubling the capacity of the harrow for stirring the ground just in proportion to the distance the bars lap each other. The draft-bars I and J, with the hook *k*, are shown in the drawing. Chains may be used in the place of bars J when desired for adjustment.

It will be evident that by placing the hooks of bars G, which are upon the parallel bars A, into holes in the edge of the cap-plate C upon the bars B, the hooked bars G upon the bars B may be dispensed with, and the result be the same.

Having fully and plainly described my improvement in harrows, what I claim, and desire to secure by Letters Patent, is—

The two sets of parallel bars A and B, Fig. 1, having their outer ends coupled substantially as described, in combination with a single line of couplings for their inner ends, substantially as and for the purpose specified.

LEVI FRANCISCO. [L. S.]

Witnesses:
THOMAS CRANE,
D. B. PECK.